(12) United States Patent
Zander

(10) Patent No.: US 6,317,569 B1
(45) Date of Patent: Nov. 13, 2001

(54) CAMERA WITH MULTI-FUNCTION CARTRIDGE-POSITIONING DOOR-OPENING SPRING

(75) Inventor: Dennis R. Zander, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/544,691

(22) Filed: Apr. 7, 2000

(51) Int. Cl.⁷ .................................................. G03B 17/02
(52) U.S. Cl. ............................................. 396/536; 396/538
(58) Field of Search ............................... 396/6, 535, 536, 396/538

(56) References Cited

U.S. PATENT DOCUMENTS

| | | |
|---|---|---|
| 4,361,391 | 11/1982 | Haraguchi et al. . |
| 5,506,650 | 4/1996 | Stephenson, III et al. . |
| 5,608,485 | 3/1997 | Kataoka et al. . |
| 5,682,570 | 10/1997 | Wakabayashi . |

*Primary Examiner*—David M. Gray
(74) *Attorney, Agent, or Firm*—Roger A. Fields

(57) ABSTRACT

A camera includes a cartridge loading chamber for receiving a film cartridge with a rotatable film spool having an exposed spool end, a rotatable support spindle which projects into the chamber to coaxially engage the spool end when the film cartridge is in the chamber, a door which pivots open to open the chamber and pivots closed to close the chamber, and a multi-function spring which urges the film cartridge to coaxially engage the spool end with the support spindle and urges the door to pivot open. The multi-function spring is a single springy piece which has a cartridge-positioning springy portion that is permanently positioned inside the chamber to urge the film cartridge to coaxially engage the spool end with the support spindle, regardless whether the door is closed, and has a door-opening spring portion that is permanently positioned outside the chamber to press against the door when the door is closed, regardless whether the film cartridge is in the chamber.

9 Claims, 3 Drawing Sheets

CAMERA WITH MULTI-FUNCTION CARTRIDGE-POSITIONING DOOR-OPENING SPRING

FIELD OF THE INVENTION

The invention relates generally to the field of photography, and in particular to cameras. More specifically, the invention relates to a camera with a multi-function cartridge-positioning door-opening spring.

BACKGROUND OF THE INVENTION

Prior art U.S. Pat. No. 5,608,485 issued Mar. 4, 1997 discloses a camera having a well known chamber for receiving a film cartridge. A rotatable support spindle projects into the chamber to coaxially engage an exposed end of a film spool substantially inside the cartridge, when the cartridge is loaded in the chamber. A bottom cover-door pivots open to open the chamber and pivots closed to close the chamber. A multi-function spring is mounted on an inner side of the cover-door to urge the cartridge to coaxially engage the exposed spool end with the support spindle, when the cover-door is pivoted closed, and to urge the cover-door to pivot open, when the cover-door is unlatched in order to remove the cartridge from the chamber.

SUMMARY OF THE INVENTION

A camera comprising a cartridge loading chamber for receiving a film cartridge with a rotatable film spool having an exposed spool end, a rotatable support spindle which projects into the chamber to coaxially engage the spool end when the film cartridge is in the chamber, a door which pivots open to open the chamber and pivots closed to close the chamber, and a multi-function spring which urges the film cartridge to coaxially engage the spool end with the support spindle and urges the door to pivot open, is characterized in that:

the multi-function spring is a single springy piece which has a cartridge-positioning springy portion that is permanently positioned inside the chamber to urge the film cartridge to coaxially engage the spool end with the support spindle, regardless whether the door is closed, and has a door-opening spring portion that is permanently positioned outside the chamber to press against the door when the door is closed, regardless whether the film cartridge is in the chamber.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
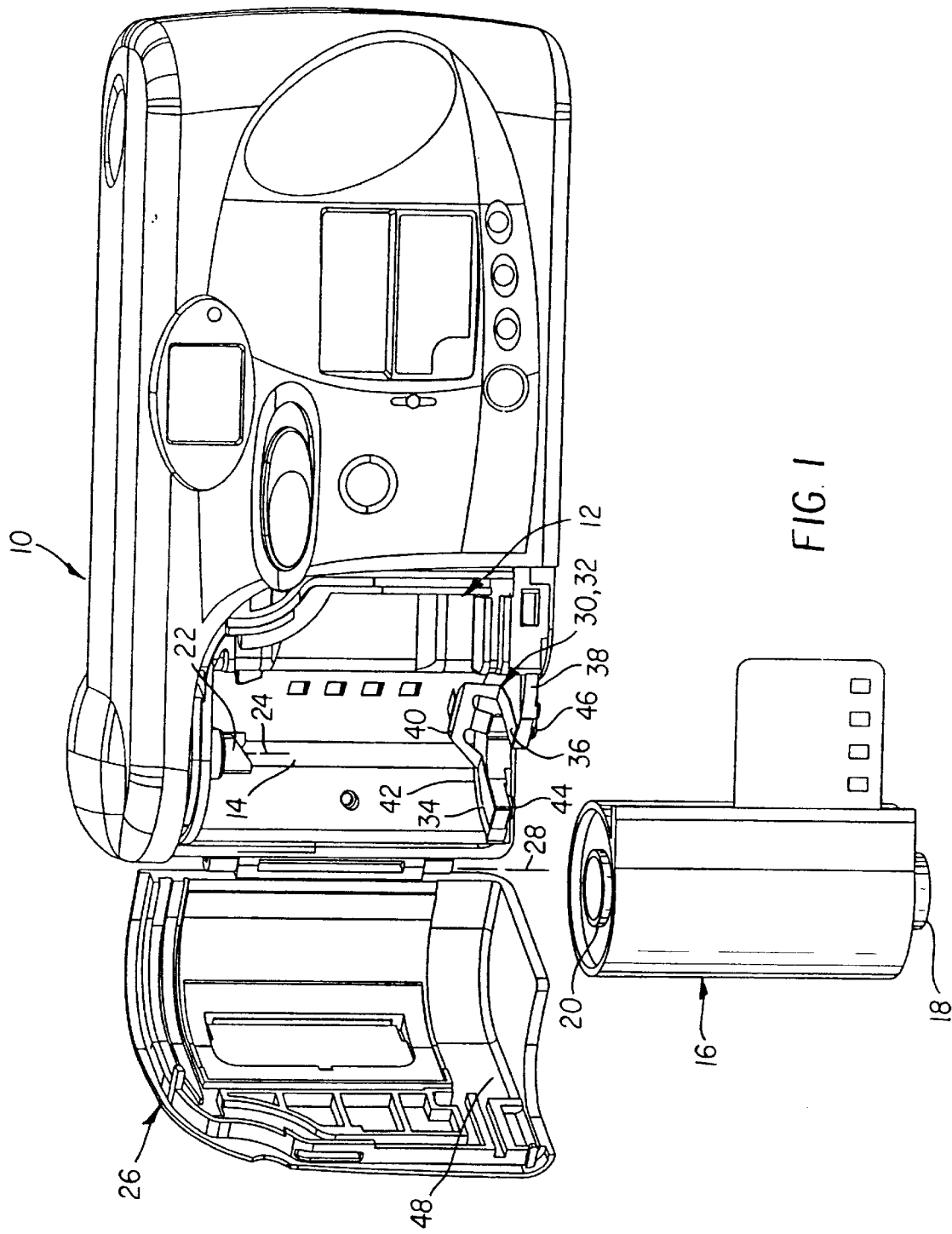
FIGS. 1, 2 and 3 are rear perspective views of a camera with a multi-function cartridge-positioning door-opening spring according to a preferred embodiment of the invention.
Figure 2:
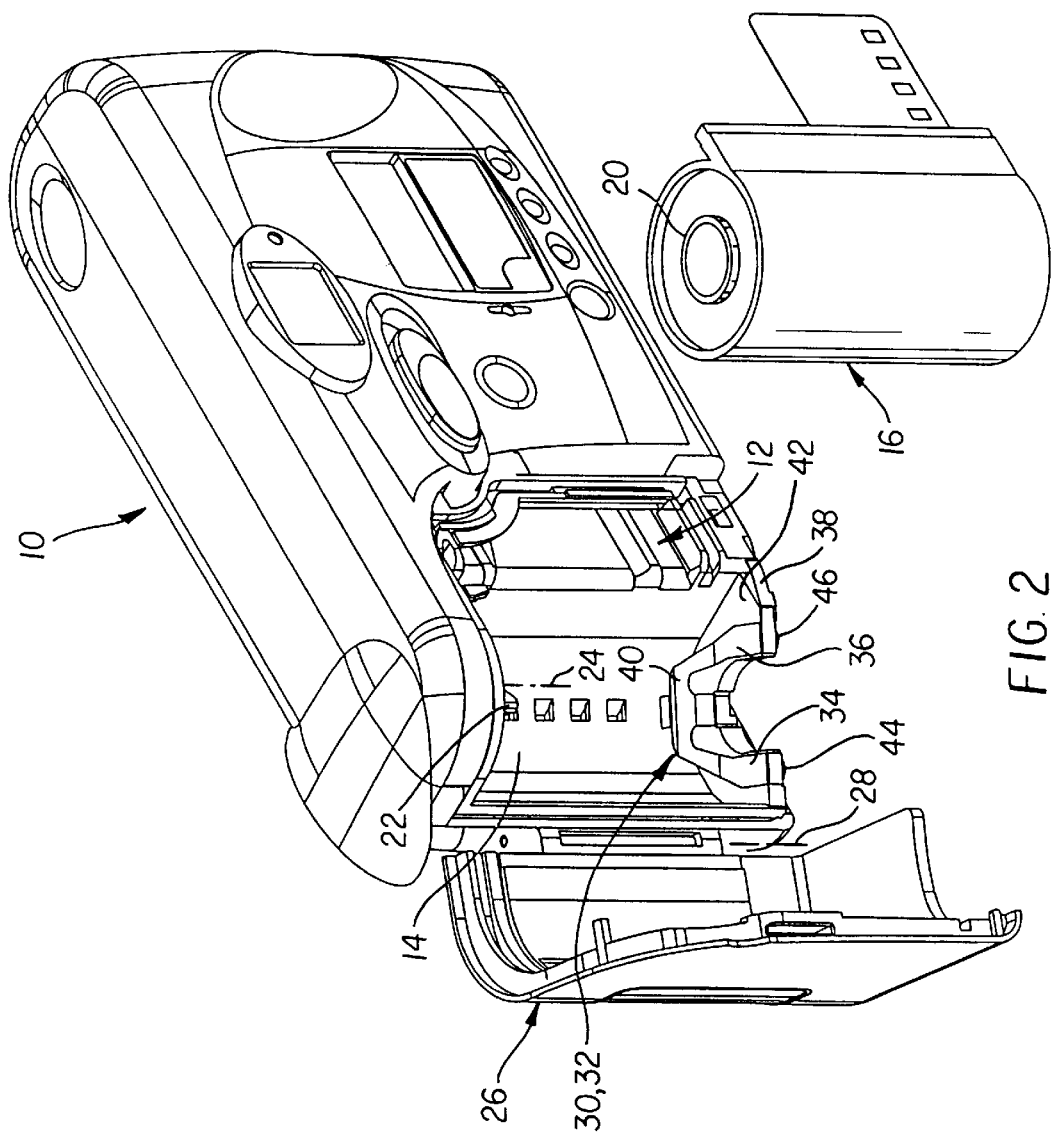
Figure 3:
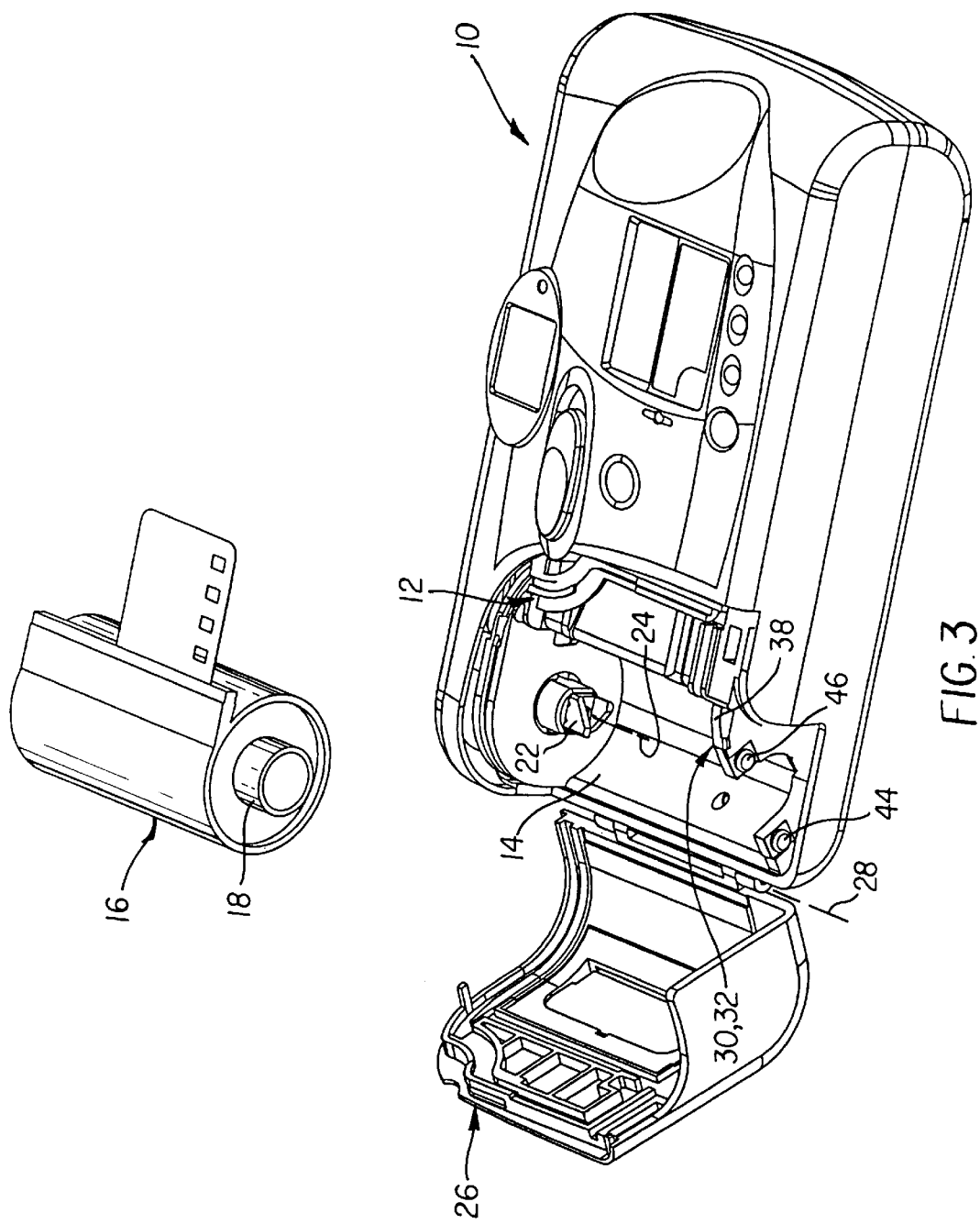

Referring now to the drawings, FIGS. 1–3 show a camera 10 including a body 12 having a rearwardly open cartridge loading chamber 14 for receiving a known film cartridge 16. A rotatable film spool 18 substantially inside the film cartridge 16 has an exposed top spool end 20. A known rotatable support spindle 22 has a rotation axis 24, and projects into the chamber 14 to coaxially engage the exposed spool end 20 when the film cartridge 16 is in the chamber.

A rear and side door 26 pivots open to open the chamber 14 and pivots closed to close the chamber. The door 26 pivots about a pivot axis 28 that is parallel to the rotation axis 24 of the support spindle 22.

A multi-function spring 30 is a single springy (elastic, resilient) piece 32 having a pair of spaced mounting legs 34 and 36, a door-opening springy portion 38 and a cartridge-positioning springy portion 40 that are integrally joined together. The pair of spaced mounting legs 34 and 36 are arranged flat on a floor 42 at the chamber 14 and are secured to the body 12 via respective fastening pins 44 and 46. The cartridge-positioning spring portion 40 interconnects the mounting legs 34 and 36, and is raised from the floor 42 and into the chamber 14 to urge the film cartridge 16 to coaxially engage the exposed spool end 20 with the support spindle 22. The cartridge-positioning spring portion 40 is permanently positioned inside the chamber 14 to urge the film cartridge 16 regardless whether the door 26 is closed. The door-positioning springy portion 38 longitudinally extends from the mounting leg 36 to between the floor 42 and the door 26 to press against an inner side portion 48 of the door 26, when the door is closed, to urge the door to pivot open. The door-positioning springy portion 38 is permanently positioned outside the chamber 14 to urge the door 26 to pivot open regardless whether the film cartridge 16 is in the chamber 14.

The invention has been described with reference to a preferred embodiment. However, it will be appreciated that variations and modifications can be effected by a person of ordinary skill in the art without departing from the scope of the invention.

Parts List 10. camera
12. body
14. cartridge receiving chamber
16. film cartridge
18. film spool
20. exposed top spool end
22. support spindle
24. rotation axis
26. door
28. pivot axis
30. multi-function spring
32. single springy piece
34. mounting leg
36. mounting leg
38. door-opening springy portion
40. cartridge-positioning springy portion
42. floor
44. fastening pin
46. fastening pin
48. inner side portion

What is claimed is:

1. A camera comprising a cartridge loading chamber for receiving a film cartridge with a rotatable film spool having an exposed spool end, a rotatable support spindle which projects into said chamber to coaxially engage the spool end when the film cartridge is in said chamber, a door which pivots open to open said chamber and pivots closed to close said chamber, and a multi-function spring which urges the film cartridge to coaxially engage the spool end with said support spindle and urges said door to pivot open, is characterized in that:

said door pivots open and closed about a pivot axis that is parallel to a rotation axis of said support spindle; and said multi-function spring has a single springy piece with individual door-opening and cartridge-positioning springy portions that are integrally joined together.

2. A camera as recited in claim 1, wherein a body defines said cartridge receiving chamber, said door is pivoted open and closed relative to said body, and said spring is mounted on said body.

3. A camera as recited in claim 2, wherein said body has a floor at said chamber, said cartridge-positioning springy portion is raised from said floor and into said chamber to urge the film cartridge to coaxially engage the spool end with said support spindle, and said door-opening springy portion extends between said floor and said door to urge said door to pivot open.

4. A camera as recited in claim 1, wherein said cartridge-positioning springy portion is permanently positioned inside said chamber to press against the film cartridge when the film cartridge is in said chamber, and said door-positioning springy portion is permanently positioned outside said chamber to press against said door when said door is closed.

5. A camera as recited in claim 1, wherein said single springy piece has a pair of spaced mounting legs, said cartridge-positioning springy portion interconnects said mounting legs, and said door-positioning spring portion longitudinally extends from one of said mounting legs.

6. A camera as recited in claim 5, wherein a body defines said cartridge receiving chamber and has a floor at said chamber, and said mounting legs are arranged flat on said floor with said cartridge-positioning spring portion raised from said floor and into said chamber and with said door-positioning spring portion arranged outside said chamber.

7. A camera comprising a cartridge loading chamber for receiving a film cartridge with a rotatable film spool having an exposed spool end, a rotatable support spindle which projects into said chamber to coaxially engage the spool end when the film cartridge is in said chamber, a door which pivots open to open said chamber and pivots closed to close said chamber, and a multi-function spring which urges the film cartridge to coaxially engage the spool end with said support spindle and urges said door to pivot open, is characterized in that:

said multi-function spring is a single springy piece which has a cartridge-positioning springy portion that is permanently positioned inside said chamber to urge the film cartridge to coaxially engage the spool end with said support spindle, regardless whether said door is closed, and has a door-opening spring portion that is permanently positioned outside said chamber to press against said door when said door is closed, regardless whether the film cartridge is in said chamber.

8. A camera comprising a body having a cartridge loading chamber for receiving a film cartridge with an exposed spool end, a rotatable support spindle which projects into said chamber to coaxially engage the spool end when the film cartridge is in said chamber, a door which pivots open to open said chamber and pivots closed to close said chamber, and a multi-function spring which urges the film cartridge to coaxially engage the spool end with said support spindle and urges said door to pivot open, is characterized in that:

said body has a floor at said chamber; and said multi-function spring is a single springy piece which has a cartridge-positioning springy portion that is raised from said floor and into said chamber to urge the film cartridge to coaxially engage the spool end with said support spindle and has a door-opening springy portion that extends between said floor and said door to urge said door to pivot open.

9. A camera as recited in claim 8, wherein said single springy piece has a pair of spaced mounting legs that are arranged flat on said floor, said cartridge-positioning springy portion interconnects said mounting legs, and said door-positioning spring portion longitudinally extends from one of said mounting legs.

* * * * *